United States Patent [19]

Patience et al.

[11] Patent Number: 5,248,940
[45] Date of Patent: Sep. 28, 1993

[54] APPARATUS FOR MEASURING CHANGES IN RADIAL AND/OR AXIAL POSITION OF A ROTOR IN A DRIVE SYSTEM INCLUDING AN EMF PRODUCING STATIONARY CONDUCTOR

[75] Inventors: Brian M. Patience, Eastbourne; David A. West, Bexhill on Sea, both of Great Britain; Palmer H. Beam, Petersham, Mass.

[73] Assignee: HMD Seal/Less Pumps Limited, England

[21] Appl. No.: 856,892

[22] PCT Filed: Sep. 18, 1991

[86] PCT No.: PCT/GB91/01593

§ 371 Date: May 13, 1992

§ 102(e) Date: May 13, 1992

[87] PCT Pub. No.: WO92/05402

PCT Pub. Date: Apr. 2, 1992

[30] Foreign Application Priority Data

Sep. 19, 1990 [GB] United Kingdom ............... 9020474

[51] Int. Cl.$^5$ ............... G01B 7/14; F04B 51/00; G01M 13/04
[52] U.S. Cl. ................ 324/207.15; 73/168; 73/660; 324/207.22; 324/207.24; 324/207.25; 324/226; 415/118; 417/63

[58] Field of Search ........... 324/173, 174, 226, 207.15, 324/207.16, 207.23, 207.25; 310/68 B; 384/448; 415/10, 118; 417/63; 340/682, 683; 73/7, 168, 660

[56] References Cited

U.S. PATENT DOCUMENTS 3,981,621 9/1976 Considine .

FOREIGN PATENT DOCUMENTS

0233411 8/1987 European Pat. Off. . . .
1303993 1/1973 United Kingdom .
2181246A 4/1987 United Kingdom .

Primary Examiner—Gerard R. Strecker
Attorney, Agent, or Firm—Samuels, Gauthier & Stevens

[57] ABSTRACT

An apparatus for measuring change of position of a rotor in a drive system having a drive rotor and a driven rotor generally concentrically mounted with respect to the drive rotor, the drive and driven rotors being magnetically coupled together. The apparatus includes a conduction device stationarily mounted between the rotors and a device for measuring the EMF (Electro Motive Force) produced in the conduction device as the rotors rotate. The apparatus also includes a device for determining, from the measurement, the relative position of the two rotors and/or the position of one of the rotors.

12 Claims, 11 Drawing Sheets

APPARATUS FOR MEASURING CHANGES IN RADIAL AND/OR AXIAL POSITION OF A ROTOR IN A DRIVE SYSTEM INCLUDING AN EMF PRODUCING STATIONARY CONDUCTOR

The present invention relates to apparatus for measuring the change of position of a rotor.

We will describe the invention with reference to socalled seal-less pumps and the like in which a driven inner rotor is connected to an impeller of the pump, the impeller and inner rotor being sealingly mounted within a closed system through which the fluid to be pumped flows, the inner rotor being mounted within a generally cylindrical sealed shroud which closely surrounds said inner rotor, and there being mounted a drive outer rotor surrounding the shroud which is magnetically coupled with the inner rotor so that as the drive outer rotor rotates, it drives the driven inner rotor and hence the impeller.

The magnetic coupling may comprise permanent magnets forming part of the inner and outer rotor, or there may be provided coils which cooperate by means of magnets produced by eddy currents, or the outer rotor may, in place of permanent magnets comprise electro magnets, the inner and outer rotor effectively forming an electric motor so that a separate motor is not required.

Such a drive system may be used to operate other apparatus for example mixers, fans and blowers. Furthermore, arrangements are known where the drive and driven rotors are disc-like and arranged face to face.

One of the difficulties of such an arrangement, as is well known, is that, because the inner rotor is mounted within the sealed shroud and is therefore not visible, it is not possible to check the bearings of the inner rotor without dismantling the apparatus. This has been a particular problem and requires the pump to be stripped at regular intervals.

The present invention relates to means for measuring change of position (e.g. radial and/or axial position) of a rotor in a drive system comprising a drive (usually outer) rotor, a driven (usually inner) rotor generally concentrically mounted with respect to the drive rotor, the drive and driven rotors being magnetically coupled together, said apparatus comprising conduction means stationarily mounted between said rotors, and means for measuring the emf (electro motive force) produced in said conduction means as said rotors rotate, and means for determining, from said measurement, the relative position of the two rotors and/or the position of one of the rotors.

It should be understood that if the bearings on the driven rotor wear, the relative radial positions of the two rotors will change and this will affect the magnetic flux coupling between the two rotors, whereby the emf produced by the conduction means will vary.

The conduction means is preferably mounted on a stationary housing between the driven and drive rotor.

The drive system may be a seal-less pump which includes a sealing shroud between the drive rotor and the driven rotor, said conduction means being mounted on or forming part of said sealing shroud.

Whilst the conduction means may comprise a single length of conductive wire which cuts the lines of the magnetic field between the drive and driven rotors as they rotate relative to the wire, in a preferred arrangement, two conduction means may be provided spaced at, for example, 180° intervals around the axis of the housing. In a preferred arrangement one conduction means may be at the top of the housing and one at the bottom. In a yet more preferred arrangement, four conduction means may be provided spaced at substantially 90° intervals around the axis of the rotors.

In place of a single length of wire, where the rotors are inner and outer coaxial rotors, the conduction means may comprise one (or more) loops (each loop comprising a sensor) including lengths extending substantially parallel to the axis ("active conductors"), and other lengths extending circumferentially around the housing ("connector wires"). The lengths extending parallel to the axis ("active conductors") may be spaced at a distance equal to the pitch distance between successive circumferentially disposed magnets attached to the inner and/or outer rotor.

The means for determining the relative positions of the two rotors may comprise a signal processing means, which may include a peak detector to detect the peak value of emf produced by each conduction means.

Conduction means may be provided at axially opposite ends of the rotor whereby to measure the skew of the rotor.

The conduction means may be provided by tracks provided on a flexible sheet base, the flexible sheet base being wrapped around the housing, and being attached thereto, preferably by adhesive.

Preferred embodiments of the invention will now be described by way of example only and with reference to the accompanying drawings in which.

Figure 1:
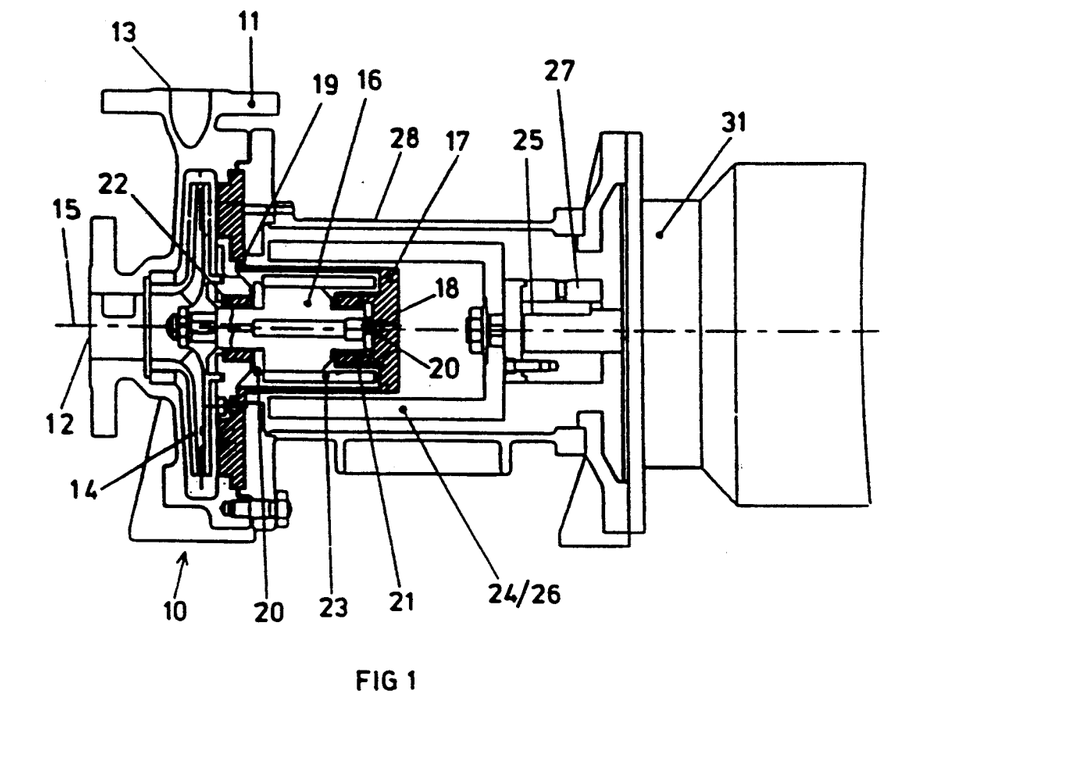
FIG. 1 is an axial section through a seal-less pump showing the general arrangement thereof, to which apparatus according to the invention may be applied.

Referring to FIG. 1 there is shown an axial section through a seal-less pump which may include the apparatus of the invention. There is provided a centrifugal pump 10 comprising a casing 11 having an inlet 12 and an outlet 13 the casing 11 mounting therein an impeller 14. The impeller 14 is driven by an inner rotor 16 having an axis 15, the inner rotor 16 being mounted within a housing in the form of a generally cylindrical sealing shroud 17. The sealing shroud 17 includes a closed outer end 18 and an inner end 19 in the form of a flange sealingly engaged with the casing 11 of the centrifugal pump 10 whereby the centrifugal pump 10 is entirely sealed. The closed outer end 18 of the shroud 17 mounts a first cylindrical bearing 21, and its inner end mounts a second cylindrical bearing 22, and the inner rotor 16 is mounted between the bearings 21,22.

In addition to the cylindrical bearings 21,22, there is provided mounted in the open inner end 19 of the shroud 17 a main thrust bearing 20 to restrain axial thrust in the inner rotor 16. The radial end faces of the second cylindrical bearing 22 provides a second thrust bearing 20.

Figure 2:
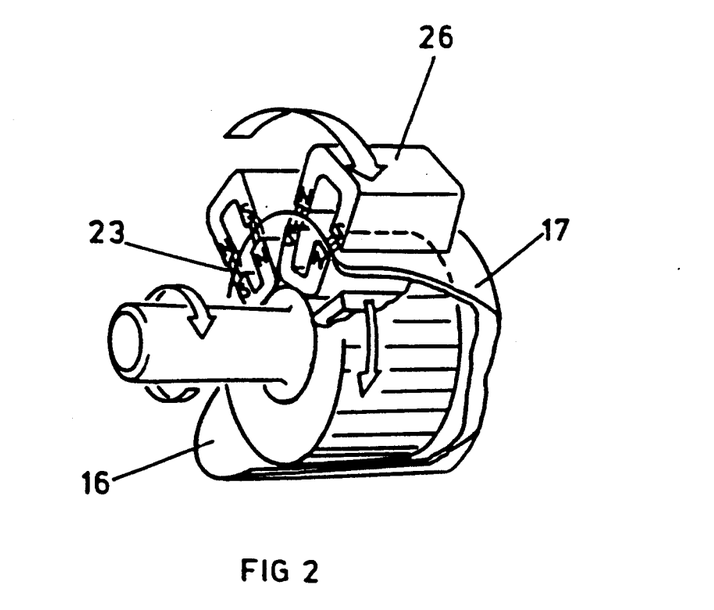
FIG. 2 is a diagrammatic perspective view of part of the apparatus of FIG. 1, showing inner and outer rotors.

The inner rotor 16 mounts around its circumference permanent magnets 23 (see FIG. 2). As is clear from FIG. 2 the permanent magnets 23 are, when viewed in axial section, "U" shaped, but extend longitudinally parallel to the axis. The effect, therefore, is to provide North and South permanent magnetic poles successively around the circumference of the inner rotor 16. Alternatively the magnet poles may be provided by rectangular (radial) section blocks of rare earth material.

It will be noted that there is only a small clearance between the outer surface of the magnets 23 and the inner cylindrical surface of the shroud 17.

Surrounding the shroud 17 is a cylindrical outer rotor 24 which as can be seen from FIG. 2 comprises a similar (but oppositely directed) set of magnets 26 to the magnets 23, the magnets 23/26 being equal in number and disposed so that the poles of the magnets 26 may be directed opposite the opposite polarity poles of the magnets 23. The magnets 26 are suitably mounted to a shaft 25 and the outer rotor 24 is mounted within an outer housing 28, on either an intermediate shaft or, via an adapter, the output drive shaft of a standard electric motor 31. The pump is thus driven by a drive apparatus comprising the outer rotor 24, the inner rotor 19, the sealing shroud 17, and the outer housing 28. The standard electric motor 31 drives the outer rotor 24.

The arrangement thus far described with reference to FIGS. 1 and 2 of the drawings comprises a well known type of seal-less pump. In operation the electric motor 31 rotates the outer rotor 24. The outer ring of permanent magnets 26 locks to the inner ring 23 of permanent magnets (poles of opposite polarity in the two sets of magnets being arranged adjacent one another), the magnetic field between the poles in the two rings of magnets 23,26 passing through the shroud 17. As a result, rotation of the outer rotor 24 is transmitted to the inner rotor 16 and this drives the impeller 14.

From time to time, it is necessary that the bearings of the inner rotor 16 should be checked. The bearings 20,21,22 of the inner rotor 16 can only be checked by removing the shroud 17. As the shroud 17 seals the pump 10, it is necessary to drain the system to remove the fluid from inside the pumps 10. This may be hazardous in that the seal-less type of pump is often used for pumping hazardous fluid. It is also expensive in plant downtime and labour costs.

It would therefore be preferable for means to be provided to measure the wear in the bearings within the shroud 17.

As has already been described, there is provided a magnetic field between the inner and outer ring of magnets 23,26. The field itself between a given pair of magnets on the inner and outer rotors will change as the distance between the inner and outer rotors changes. As the cylindrical bearings 21,22 of the inner rotor 16 wear, the relative position of the inner rotor 16 with respect to the outer rotor 24 will vary. Typically, as the cylindrical bearings 21,22 wear, the inner rotor 16 will tend to drop (although this may not necessarily be the case, the wear may be in a different plane). This will cause the magnetic field between the rotors to change.

Of course, the particular value of magnetic flux varies around the circumference of the inner rotor and is at a maximum where the poles of the magnets of the inner and outer rotor are adjacent one another.

Figure 4:
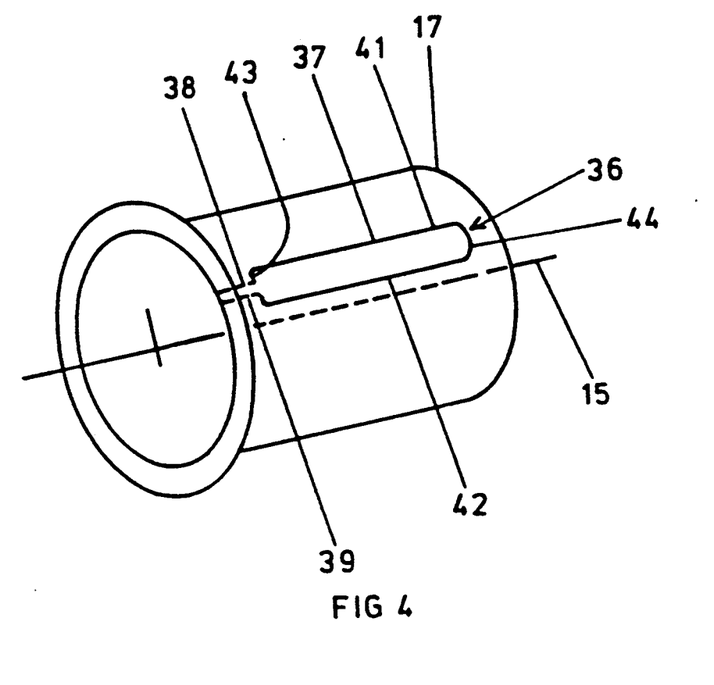
FIG. 4 is a diagrammatic view of a shroud, forming part of the apparatus of FIG. 1 to which a sensor is mounted.

We now refer to FIG. 4 which shows, in diagrammatic form, a shroud 17. According to FIG. 4, there is mounted on the outer surface of the shroud 17 (although it may be mounted on the inner surface but that would needlessly complicate matters or, if the shroud is of layered or plastic construction, within the material of the shroud, or may be printed onto the surface of the shroud) a sensor 36 for detecting the magnetic field at the surface of the shroud 17. The sensor 36 may comprise a conductive wire which extends parallel to the axis of the apparatus from the inner end 19 to the outer end 18. However because it is within the outer rotor 24, it is necessary for the conductive wire of sensor 36 to return back to the inner end 19 and so, in accordance with the arrangement in FIG. 4, we provide the sensor 36 in the form of a square or rectangular loop 37 of conductive wire. There is provided an input lead wire 38 and an output lead wire 39 which are arranged to be close to one another and parallel, and extend from the inner end 19 of the shroud 17 to the sensor loop 37. The sensor loop 37 has two active conductors 41,42 which extend parallel to the axis 15, and two connector wires 43,44 which extend circumferentially. The inner connector wire portion 43 is broken and connected with the input and output lead wires 38,39. The active conductors 41,42 form sensing wires since, as will be understood, as the inner and outer rotors 16,24 rotate the lines of magnetic field will cut the active conductors 41,42 and provide an emf therein, the value of which depends, at any one time, on the speed of rotation and the magnetic field.

Figure 8:
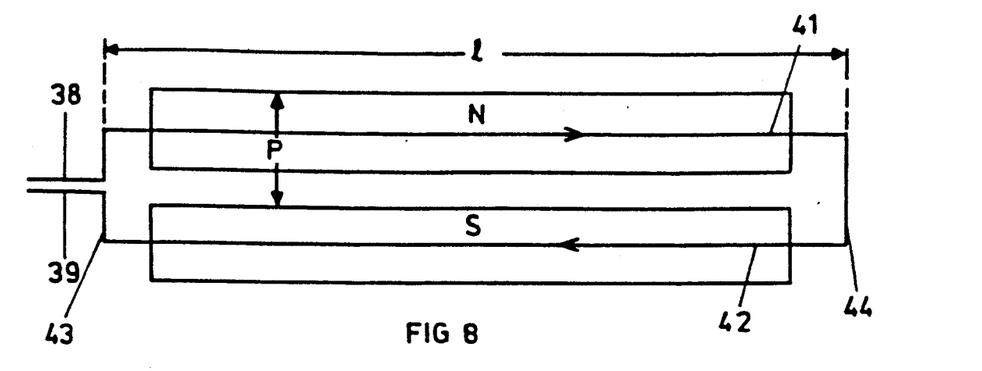
Figure 9:
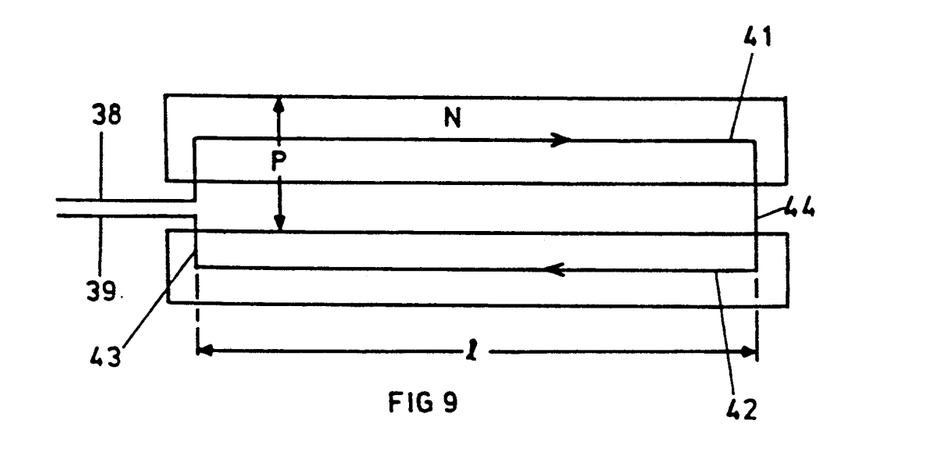

FIGS. 8 and 9 show developed diagrams showing two possible relative disposition between the loop 37 and adjacent magnetic poles (N and S) of the magnets 23 or 26. In FIG. 8, it will be seen that the active conductors 41,42 are longer than the axial length l of the magnetic poles, and in FIG. 9 they are shorter. It will also be observed that in both cases the circumferential connector wires 43,44 are of a length which equals the pitch length p so that the two active conductors 41,42 are spaced apart by the pitch length p and are therefore disposed under corresponding parts of adjacent poles N and S.

Because the active conductors 41,42 are spaced by p, the pitch distance, the maximum signal possible is obtained since both active conductors 41,42 are directly under their respective but opposite magnetic poles at the position of maximum field strength. Each active conductor 41,42 cuts the magnetic flux of the rotating magnetic field to produce induced emf, emf in each of the active conductors 41,42 adding by virtue of the fact that oppositely directed active conductors 41,42 are passing in the same direction through oppositely disposed magnetic fields, as has already been described, the flux varies, being at a maximum value where two poles are immediately adjacent one another. Thus as the rotors rotate, the emf produced by the active conductors 41,42 will vary in a cyclic manner as each pair of poles passes the active conductors 41,42, the peak value of the ($emf_{peak}$) produced providing a measure of the maximum magnetic flux between the poles.

The input and output lead wires 38,39, by virtue of being placed close to one another, are situated in the same magnetic field and since they are disposed oppositely to one another, the emf producing effect is cancelled out in the two lead wires 38,39.

The spacing between the inner and outer rotors 16,24, is a function of wear of the cylindrical bearings 21,22. (ignoring, for the moment, wear in the electric motor bearings 27 which mount the outer rotor and are subjected to much less wear than bearings 21,22). As the cylindrical bearings 21,22 of the inner rotor 16 wear and the rotor moves (normally) downwardly, the peak value of magnetic field and hence the flux will change at different points around the surface of the shroud 17. If, for example, the inner rotor 16 effectively moves downwardly as the cylindrical bearings 21,22 wear, then by placing a sensor 36 at the top (or bottom) of the shroud 17, the value of $emf_{peak}$ of the sensor 36 will change with time as the bearings wear.

Of course, as will be understood, the induced $emf_{peak}$ in each active conductor 41,42 is also proportional to the length l of the active conductor and as illustrated in FIGS. 8 and 9, should be either slightly longer or slightly shorter than the axial length of the magnetic poles to allow for movement of the magnetic poles axially.

We will now describe the operation of the arrangement thus far described with reference to FIG. 1,2,4,8 and 9. As the rotors 16,24 rotate then successive pairs of poles in the inner and outer rotors will pass over the sensor 36. The flux will vary as the rotors rotate from a maximum when the poles are situated as shown in FIGS. 8 and 9, that is with the middle of each pair of poles in inner and outer rotors directly over each active conductor 41,42, to a minimum when the gaps between each pair of poles on the outer rotor (or inner rotor) overlie the active conductors 41,42. Effectively therefore a cyclic emf is produced of generally sinusoidal form. By detecting the peak value of emf, one can provide an output signal which is dependent upon the peak value of magnetic flux between the magnets 23,26.

As the bearings wear, the inner and outer rotors move with respective to one another in a radial direction. If the sensor is placed in position in which the inner and outer rotors are moving relatively towards one another, as the bearings wear, then the peak value of the detected signal $emf_{peak}$ will increase because the maximum cyclic value of magnetic flux will increase. Conversely, if the sensor 36 is placed at 180° to that position, then the magnets of the inner and outer rotors will move apart as the bearings wear and thus the peak cyclic magnetic field will decrease and the $emf_{peak}$ output signal will reduce. In principle, therefore, one can measure the amount of wear in the bearings of the inner rotor by this method, without the necessity to strip the pump to view the bearings themselves.

For the measurement of radial wear, the sensitivity of the sensor is independent of the length of the sensor 36, since for radial displacement of the inner rotor 16 it is the magnetic flux density which is changing.

The geometry shown in FIGS. 8 or 9 would give the maximum signal and therefore the maximum signal to noise ratio, since the error signal in the lead wires 38,39 is constant, thus improving the accuracy of the radial wear measurement.

We have described the arrangement utilising a single sensor 36 which, for example, may be situated at the top or the bottom of the housing.

In a preferred arrangement, however, in order to be able to determine any radial wear of the cylindrical bearings 21,22 in any radial position around the axis 15, we prefer to provide three or more, preferably four sensors similar to the sensor 36 spaced at 90° intervals around the circumference of the shroud 17. Typically, the sensors 36 may be at the top, bottom and two opposite sides of the shroud 17. In this way, by measuring the $emf_{peak}$ of all of the sensors 36, we can determine any radial wear of the cylindrical bearings 21,22.

We will refer to the two side sensors as 36A,36B and the top sensor as 36C, the bottom sensor as 36D. These are shown in FIG. 11 which shows a diagrammatic end view.

Figure 11:
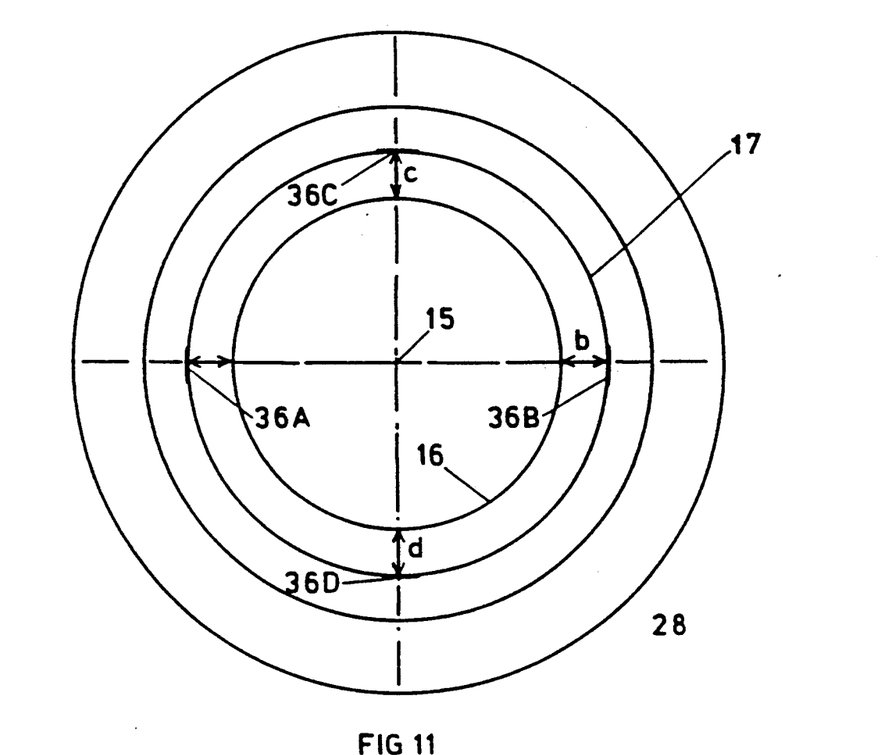
FIG. 11 is a diagrammatic transverse view showing the position of sensors.

FIG. 11 shows the physical arrangement of the sensor array in relation to the outer and inner rotors 16,24. For simplicity a physically symmetrical model is shown in which all initial air gaps a, b, c, and d between the inner rotor and the shroud adjacent respectively sensors 36A,B,C,D are equal and equal I. The output voltages of sensors 36A,B,C,D (i.e. $emf_{peak}$) respectively are $V_A$, $V_B$, $V_C$ and $V_D$ and are assumed to be initially equal. Wear vertically downwards will cause the sensor voltages $V_C$ and $V_D$ to decrease and increase respectively, due to the respective increasing and decreasing gap between the rotors. Sensors voltages $V_A$ and $V_B$ will both decrease by an equal amount but less than the decrease in $V_C$. Conversely wear vertically upwards will cause $V_C$ to increase, $V_D$ to decrease, and $V_A$ and $V_B$ to both decrease. Wear in the horizontal direction can be determined by similar reasoning.

Figure 12:
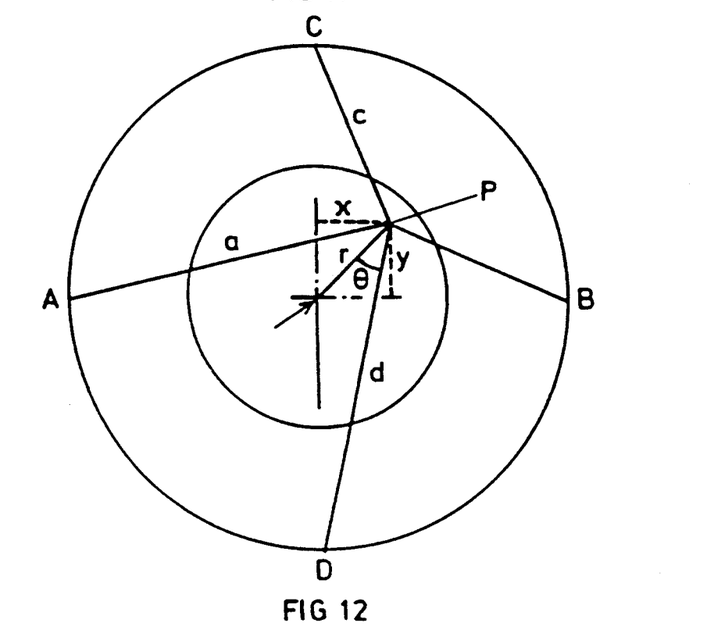
FIG. 12 is a mathematical drawing.

In general the direction of radial wear will not be along either of the sensor axes 36A/36B or 36C/36D and to measure the wear requires a geometrical model as shown in FIG. 12 which is a geometric equivalent representation of FIG. 11. It can be shown that for any general point P (the position of the axis of inner rotor 16 after wear in the bearings 21,22) the vertical and horizontal components x and y, from the original axis are given by:

$$x = \frac{(a^2 - b^2)}{4I} \quad y = \frac{(d^2 - c^2)}{4I}$$

Where $I$ is the initial gap from which can be deduced the wear magnitude r and angle $\Theta$ since:

$$r^2 = x^2 + y^2 \quad \tan\Theta = \frac{(d^2 - c^2)}{(a^2 - b^2)}$$

Now the relationship between the sensor voltages and their corresponding air gap is given by:

$$a = \frac{(V - V_A)}{K_r} + I \quad b = \frac{(V - V_B)}{K_r} + I$$

$$c = \frac{(V - V_C)}{K_r} + I \quad d = \frac{(V - V_D)}{K_r} + I$$

Where V is the initial voltage in a physically symmetrical model corresponding to the initial gap I and $K_r$ is a constant.

For a given pump the values of I and $K_r$ will be known, hence the values of x,y,r and $\Theta$ can be calculated.

The sensor voltages $V_A$, $V_B$, $V_C$, $V_D$ are all proportional to speed and any other changes will introduce proportional errors in the calculated values of r. However, the voltage V can be expressed in terms of $V_A$, $V_B$, $V_C$, $V_D$ and the machine constants, which is proportional to the speed and independent of radial wear.

It we divide the term for r by the speed term, which is proportional to speed but independent of radial displacement, then we have an expression for radial wear which is independent of speed. Hence:

$$\text{Radical displacement} = \frac{\sqrt{x^2 + y^2}}{K_s \cdot V}$$

Where $K_s$ is a constant

We have so far confined the description to the use of a plurality of sensors spaced at various radial points around the axis to measure the wear in the cylindrical bearings 21,22. It is also useful to measure wear in the two thrust bearings 20 and to do this it is necessary to measure the axial movement of the inner rotor 16.

Figure 5:
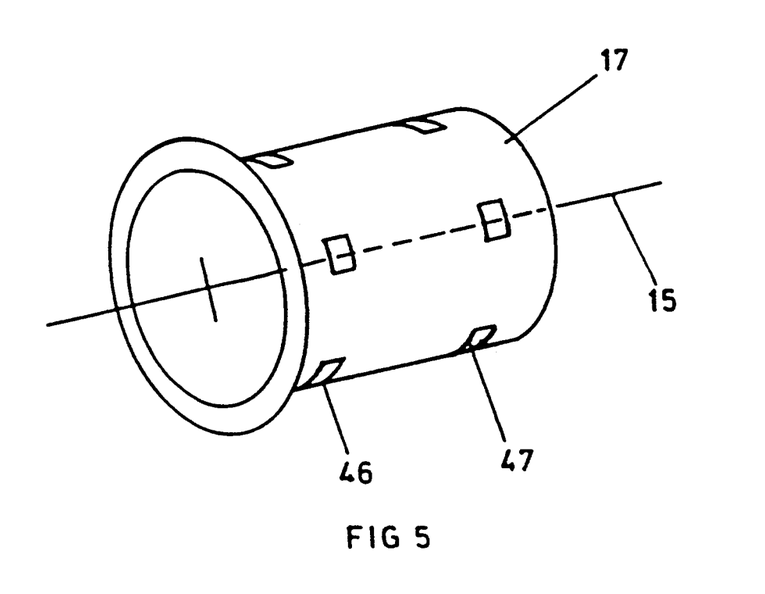
FIG. 5 is a view similar to FIG. 4 showing an alternative arrangement of sensors.
Figure 6:
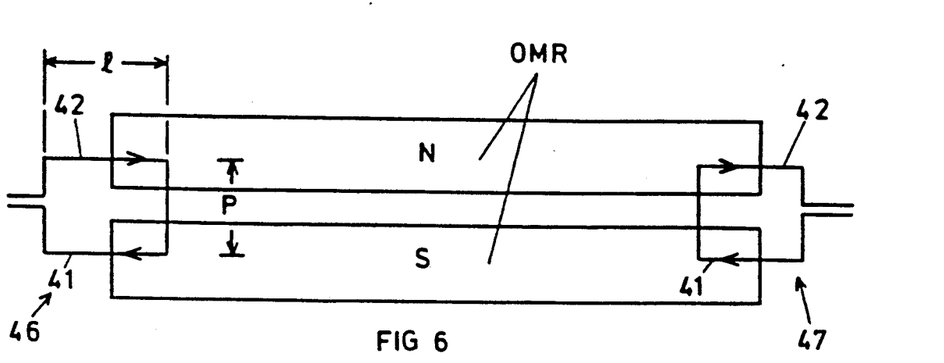
FIGS. 6 to 9 are part developed views showing various arrangements of sensors.
Figure 7:
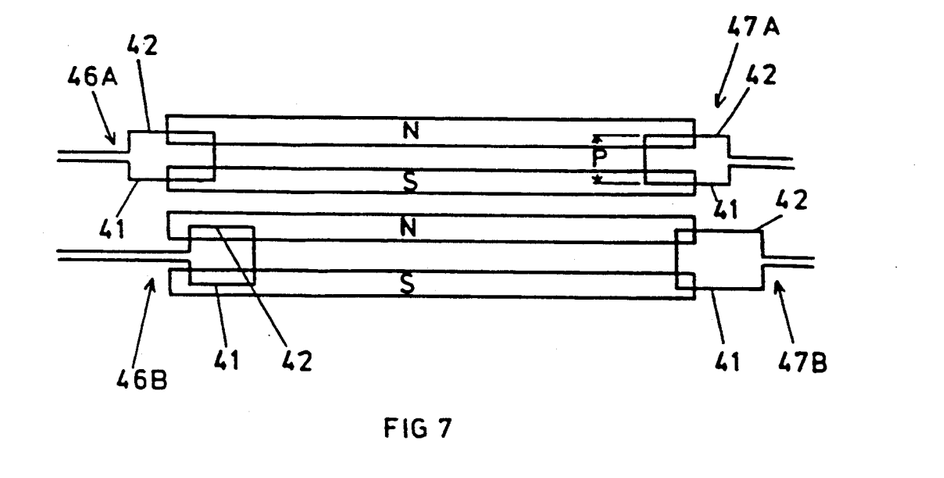

This may be carried out by providing two sets of sensors adjacent axially opposite ends of the magnets 26. This arrangement is shown in FIGS. 5,6 and 7. In this arrangement, there is provided a first set of sensors 46 at one axial end of the magnets 26, and a second set of sensors 47 at the opposite axial end of the magnets 26. Each set of sensors 46,47 may comprise a single sensor but will more usually comprise the four sensors already referred to. Thus a set of eight sensors in all will be provided.

In this case, each sensor 46 comprises two active conductors 41,42 spaced apart by the pitch distance p, the length of the active conductors passing beyond one end of the magnet 23. Similarly the other sensor 47 is arranged straddling the opposite end of the magnet 23. FIG. 7 shows a somewhat similar arrangement but in this case adjacent sensors 46A,46B in a first set of sensors are disposed in axially different positions, one straddling the end of the magnet 23 and the other being inside the length of the magnet 23. A similar arrangement applies to sensors 47A, 47B.

Figure 10:
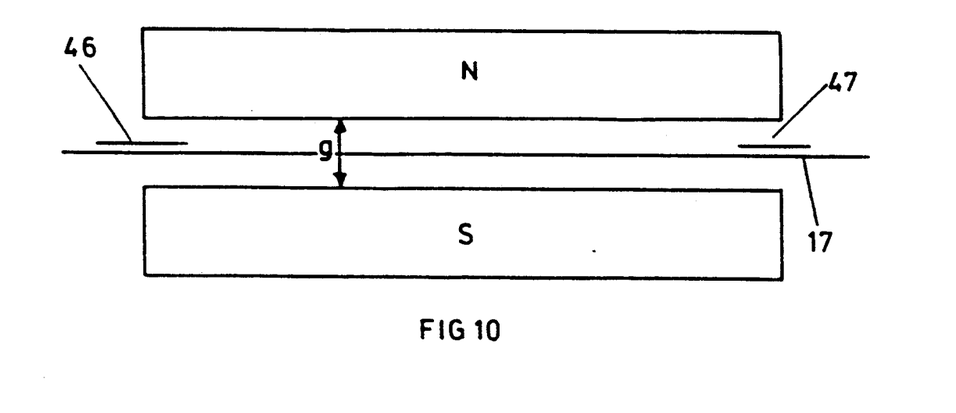
FIG. 10 is a part axial section through a pair of adjacent permanent magnets on the inner and outer rotor and the part of the shroud therebetween.

FIG. 10 is a part diagrammatic axial section showing the arrangement of FIG. 6. It shows the relative dispositions of the magnets 23,26, the shroud 17, and the sensors 46,47.

Consider now the effect of axial displacement of the inner rotor 16 relative to the shroud 17 on the two sets of sensors, 46,47 as shown in FIGS. 6 and 10. Axial displacement of the inner rotor 16 will result in the output $emf_{peak}$ of one set of sensors 46 or 47 increasing and the other decreasing. If $V_1$ and $V_2$ are the corresponding sensor voltages then the displacement is proportional to $V_1 - V_2$.

However $V_1$ and $V_2$ are both proportional to speed, and therefore any speed changes will alter the term $V_1 - V_2$. If we divide this term by $V_1 + V_2$, which is proportional to speed but independent of axial displacement, then we have an expression for axial wear which is independent of speed. Hence:

Where $K_a$ is a constant.

$$\text{Axial displacement} = \frac{K_a(V_1 - V_2)}{(V_1 + V_2)}$$

Furthermore, in the arrangement of FIG. 6, in which there are provided, for example, four sensors in each of set of sensors 46,47 we may, by measuring simultaneously any offset movement of the part of the inner rotor detected by the two sets of sensors 46,47, detect any skew of the inner rotor 16. This may be calculated by the same method as is described with reference to FIG. 12 but in respect of the two sets of sensors 46,47, and comparing them.

We now consider the special case of a locked rotor. This abnormal behaviour can occur for a number of reasons, and early detection and action is necessary to prevent damage. With a stationary inner rotor 16 severe distortion of the magnetic field pattern takes place and manifests itself as a significant reduction in sensor signal levels, much larger than any reduction due to bearing wear or small speed deviations about the nominal. Since for a given pump running at a given nominal speed the average values of signal levels will be known, large signal changes can easily be discriminated from the small changes due to bearing wear, or the complete absence of a signal due to an open circuit sensor, in order to detect a locked rotor condition.

Figure 14:
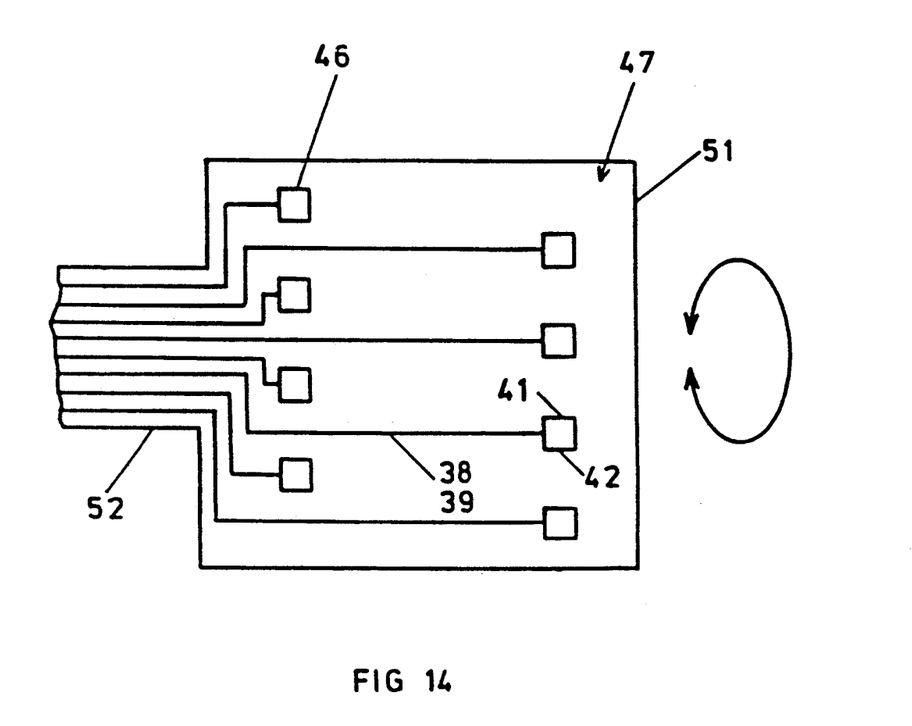
FIG. 14 is a view of a sheet comprising the electrical circuitry for forming the sensors.

The form in which the sensors 36 or 46, 47 are provided can vary. The conductive portions comprising the input and output lead wires, active conductors and connector wires may be provided by suitably shaped lengths of wire mounted to the shroud 17, but we prefer to provide them in the form of conductive tracks on a flexible sheet substrate. FIG. 14 shows laid out flat a sheet 51 of non-conductive flexible substrate on which are laid in the form of conductive copper tracks, sets of sensors 46,47. The sheet 51, in use, is wrapped around the outer surface of the shroud 17, the width of the sheet 51 equalling the outer circumference of the shroud 17, and the length of the sheet equalling the axial length of the shroud 17. A tongue 52 of the sheet 51 may provide output lead wires for all of the sensors of the sets of sensors 46,47.

Figure 13:
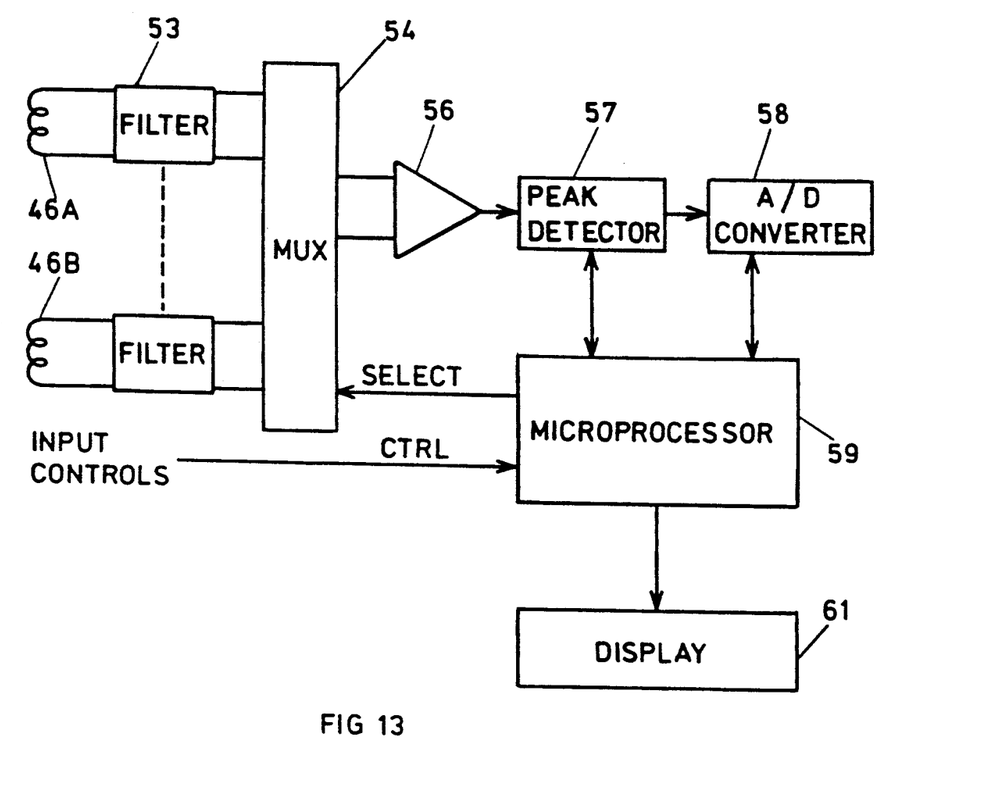
FIG. 13 is a block electrical circuit diagram showing the components of a signal processing apparatus for processing the output signals of the sensors.

We now refer to FIG. 13 which shows a block diagram of the electronic apparatus for dealing with the output signals from the sensors. One sensor 46A,46B from each set of sensors 46,47 is shown. The wires from each sensor are connected to a respective filter 53, each filter 53 being connected to a multiplexer 54. The multiplexer 54 under control of a SELECT signal selects the output signal of one of the filters and passes this to an amplifier 56, the output of the amplifier 56 being passed to a peak detector 57. The output of the peak detector 57 is passed to an analog to digital converter 58. A microprocessor 59 is provided having connections to the peak detector 57 and to the analog to digital converter 58, and controlling (by the SELECT signal) the multiplexer 54. The microprocessor 59 also drives a display 61 and is controlled by input control signals CTRL.

Figure 15:
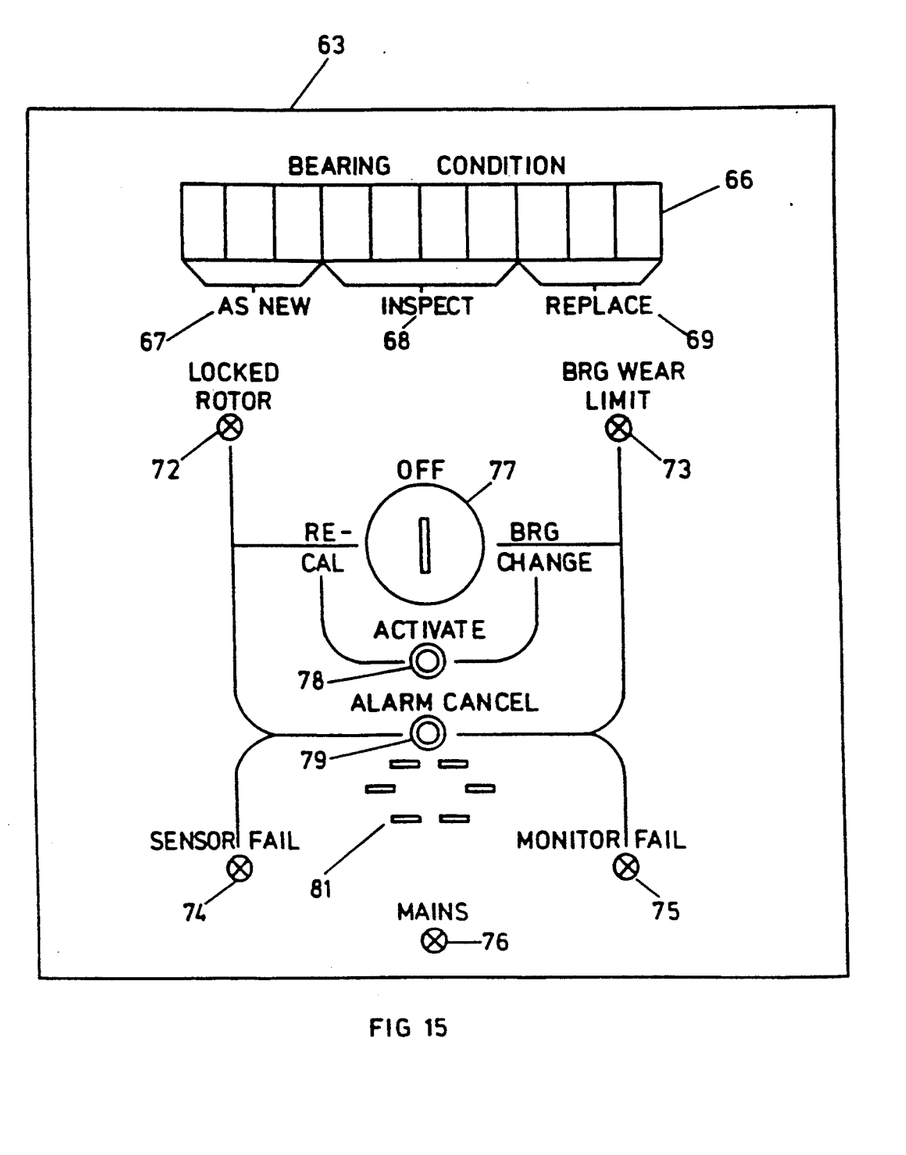
FIG. 15 shows a front view of a control panel for controlling the bearing measuring apparatus.

FIG. 15 shows a front view of the control panel for the apparatus thus far described. The control panel 63 comprises a bearing condition indicator 66 in the form of ten lamps. The first three lamps 67 are labelled "AS NEW", the middle four lamps 68 are labelled "INSPECT" and the right hand set of three lamps 69 indicate "REPLACE", the lamps may be of different colours.

There are five further lamps as follows:
lamp 72 labelled "LOCKED ROTOR"
lamp 72 labelled "BEARING WEAR LIMIT"
lamp 74 labelled "SENSOR FAILED"
lamp 75 labelled "MONITORED FAILED"
lamp 76 labelled "MAINS"

There is provided a key switch 77 and buttons 78 labelled "ACTIVATE" and 79 labelled "ALARM CANCEL". An audible alarm is provided behind slots 81. In use of the control panel, when the pump is first installed with new bearings, it must be initially calibrated. The key switch 77 is turned to the right hand position (labelled "BEARING CHANGE") and the ACTIVATE button 78 is compressed. It is known that at this point the bearings are in order and therefore the initial signal values are recorded and memorised by the electronic circuit as the pump rotates.

After this initial recording of the output signals, the key switch returns to the position shown in FIG. 15. At this stage, only one of the lamps 67 "AS NEW" should be illuminated. As the bearings wear with time, the signal values will change and this can be indicated by an increase in the number of lamps 66 illuminated. As the lamps 68 begin to be illuminated, the bearings should be inspected and certainly by the time the lamps 68 are illuminated the bearings should be replaced. As one reaches the bearing condition where the bearing should be replaced, the alarm 73 may be operated.

Similarly, if any of the sensors should fail, as indicated by the output signal from a particular sensor, then the alarm may be caused to operate. The lamp 74 "SENSOR FAIL" will also be illuminated so that it is obvious to the operator what the problem is.

Similarly, if the rotor locks, then the lamp 72 will be illuminated and the alarm operated. If the monitor fails, then the lamp 75 "MONITOR FAIL" will be illuminated and the alarm indicated.

Figure 3:
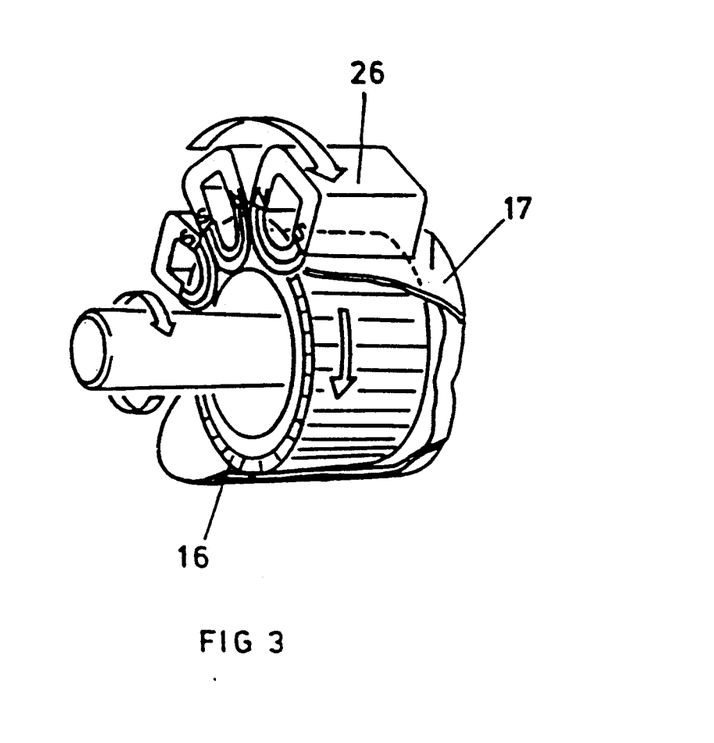
FIG. 3 is a view similar to FIG. 2 of an alternative arrangement.

An additional facility is also provided to effect automatic recalibration of the system when the button 78 is pressed and the key switch 77 is in its left hand position. This is necessary on synchronously coupled pump drives (as illustrated in FIG. 2) after they have been dismantled and reassembled (for example to free a locked rotor) but without replacing the bearings. Since there are a number of radial positions in which the two rotors can be magnetically locked it is likely that during maintenance the relative rotor positions will be altered and this will modify the sensor voltages by virtue of the mechanical and magnetic tolerances of the magnets. This will have the effect of increasing or decreasing the sensor voltages by a constant amount and not by a proportional amount and the mathematical models used by the software for measuring axial and radial wear will be in error. When a recalibration is initiated as above, the initial stored parameters are modified such that the correct values (i.e. those also stored prior to disassembly) are obtained. This facility is unnecessary for a torque ring drive as shown in FIG. 3. It will be understood that by use of key switch 77 the apparatus can only be recalibrated or a bearing change noted by an authorised operator.

The electronics circuit may continuously or at intervals cross check the signal for each sensor against the stored initial value of signal for that sensor and from this difference in values determine the movement of the inner rotor and hence the bearing wear.

We now consider some details of the set-up and reset aspects of the apparatus. Due to mechanical tolerances, the initial values of sensor voltages, i.e. the sensor voltages on a pump fitted with new bearings, will not be equal, and therefore give rise to initial axial and radial offsets.

The initial axial offset is caused by asymmetrical axial alignment of the inner and outer rotors and the shroud, due to manufacturing tolerances; and the accuracy to which the sensors can be attached to the shroud 17. The permissible manufacturing tolerance of the apparatus is the dominant cause of misalignment, although it can be regarded as remaining constant for a given pump throughout its lifetime, With the permissible tolerances, the difference between the worst case extremes of the axial displacement is comparable with that of the length of each sensor itself. Under such worst case conditions, the sensors could be totally misaligned with the rotors on different pumps, and this would severely affect the sensitivity of the sensor and the accuracy of any measurement.

The positional errors in attaching the sensors to the shroud also introduces a degree of initial misalignment. This can also be regarded as constant for a given pump and time-invariant.

To compensate for the foregoing axial offsets, a plurality of staggered axial sensors may be provided as shown in FIG. 7, and the optimum pair selected either manually or automatically in order to maximise the sensor sensitivity and the accuracy of measurement. Different arrangements of sensors may be provided for different designs of pump.

The initial axial position of the inner rotors is also subject to the manufacturing tolerance of the bearings supporting the rotor shaft even when new.

There is initial axial freedom for the shaft within defined limits known as the end float. In practice the shaft will normally assume a position to the left in FIG. 1, by virtue of the hydraulic thrust force on the impeller. By measuring and storing the initial axial offset value and subtracting the initial value from the measured value, a true measure of axial displacement can be obtained.

Initial radial offsets are due mainly to the non-concentricity between the rotor and the shroud, and which for a given pump can be regarded as constant. By measuring and storing the initial voltages we can calculate the initial value of the co-ordinates x and y. By subtracting the initial values from the measured values we can obtain a true measure of radial displacement.

We have described the arrangement with respect to a drive apparatus having an inner and outer ring of magnets as shown in FIG. 2. FIG. 3 shows an alternative arrangement to which the invention may be applied in which only the outer rotor includes permanent magnets, the inner rotor including a so called torque ring in which, by virtue of induced eddy current, a magnetic field is induced in the inner rotor without the provision of permanent magnets in the inner rotor.

We now refer to the arrangements of FIGS. 16 to 20.

Figure 16:
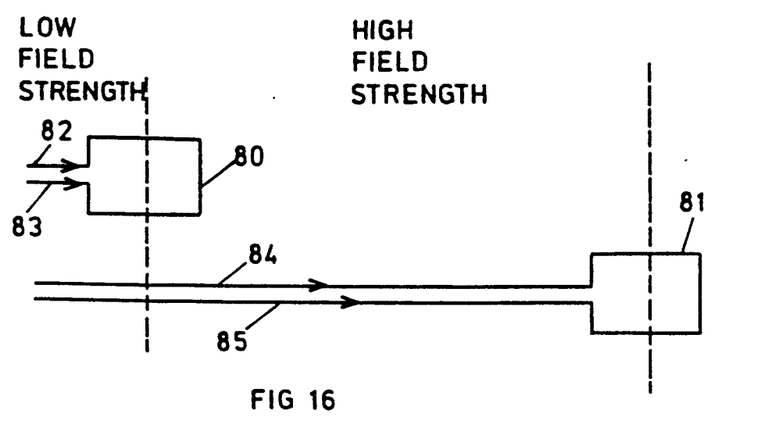
FIGS. 16 to 18 are part developed views showing various arrangements of sensors in which the lead wires are arranged to improve the accuracy of the signal, and, FIGS. 19 and 20 are wave forms produced by the arrangements, respectively, of FIGS. 17 and 18.

FIG. 16 shows a typical pair of sensor loops 80,81 for measuring radial and axial wear, although in practice four such pairs are required. Each sensor loop has a pair of lead wires 82,83 (connected to loop 80) and 84,85 (connected to loop 81). The lead wires 84,85 will be subject to an induced emf by virtue of the changing magnetic field. The lead wires 82,83 are of less relevance because they are in the low field strength area.

The emf produced by each lead wire 84,85 tends to cancel out particularly as they are arranged to be as close as possible and are arranged centrally with respect to the sensor loop 81. If the individual wires of the lead wires 84,85 were coincident in space (theoretically possible only) there will be no resultant induced emf in the wires since the individual emfs (as shown by the arrows in FIG. 16) would not only be equal but also oppose each other and therefore give perfect cancellation.

In practice the individual wires are spatially disposed, and due to the non-uniform and continually changing magnetic field a small resultant noise emf will be induced and this is added to the signal from the sensor loop 81 thus giving an error component.

Although this noise signal is minimal at the time the emf in the sensor loop 81 is at a maximum by virtue of its central positioning, and the peak detector samples at this point to maximise the signal-to-noise ratio, the error component is still finite. The error signals are proportional to the length of the conductors in the magnetic field and as can be seen from FIG. 16 the lead wire length of sensor loop 81 is significantly greater than that of sensor 80. The result of this is the accuracy of radial wear calculation using the signal from sensors with long lead wires is lower than that obtainable from sensors with a short lead wires, due to the higher error component.

Figure 17:
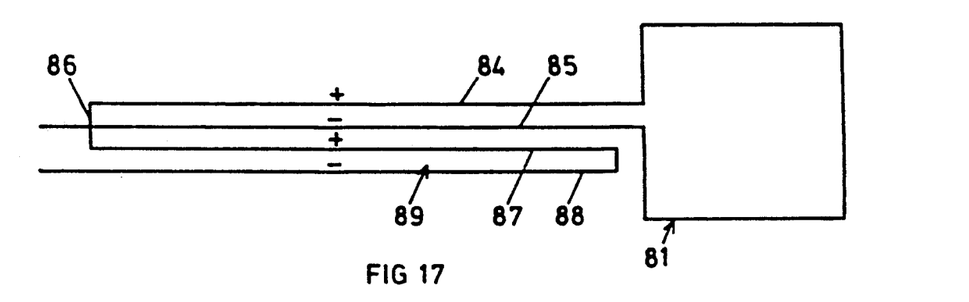

FIG. 17 shows an arrangement of lead wires 84,85 and sensor loop 81 in which the lead wire 84 is arranged to cross over the lead wire 85 by means of a cross over wire 86, then extends back parallel to wire 85 by means of a lead wire 87 towards the sensor loop 81, and then passes back parallel to the lead wire 87 by means of a lead wire 88, the lead wires 87 and 88 forming a side loop 89. Since the side loop 89 is of the same length as the sensor lead wires 84,85, and also in close proximity to them, the induced emfs in the lead wires 84,85,87,88 are similar. There is a slight phase shift between the induced emfs from 84,85 and 87,88 by virtue of the physical disposition of the conductors. However their peak amplitudes are the same. By connecting them as shown the induced emfs tend to cancel each other out giving a much lower overall residual noise component.

Figure 19:
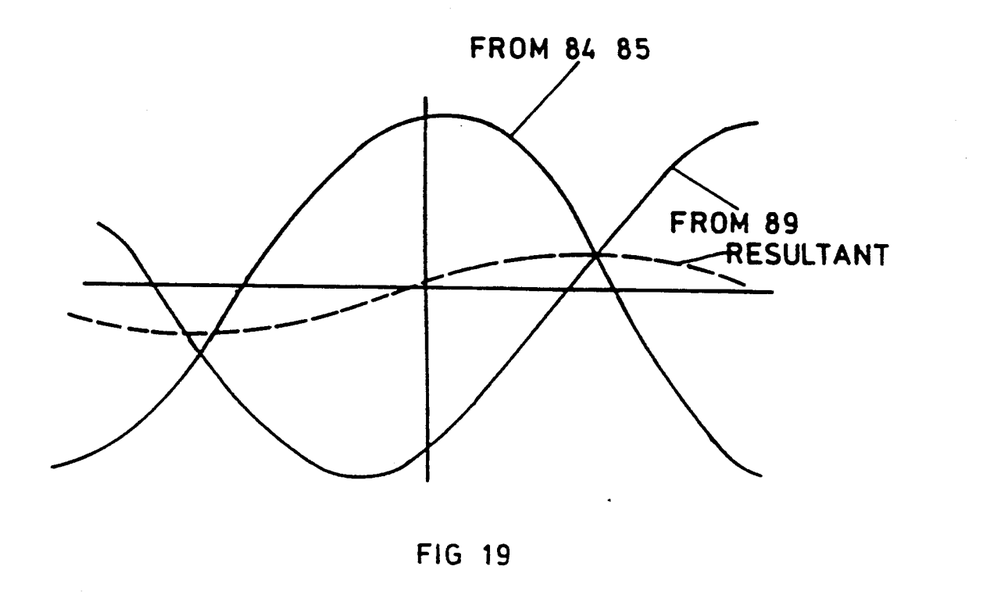

FIG. 19 shows the noise component wave form in both the lead wires 84,85 and side loop 89 and their resultant as seen by the monitor.

Figure 18:
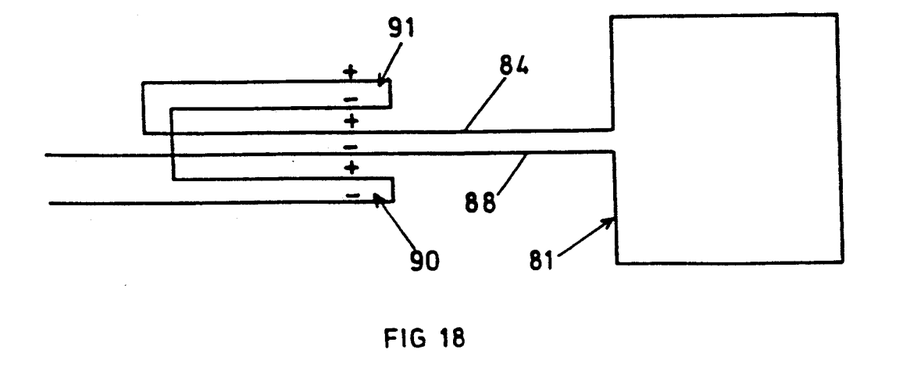
Figure 20:
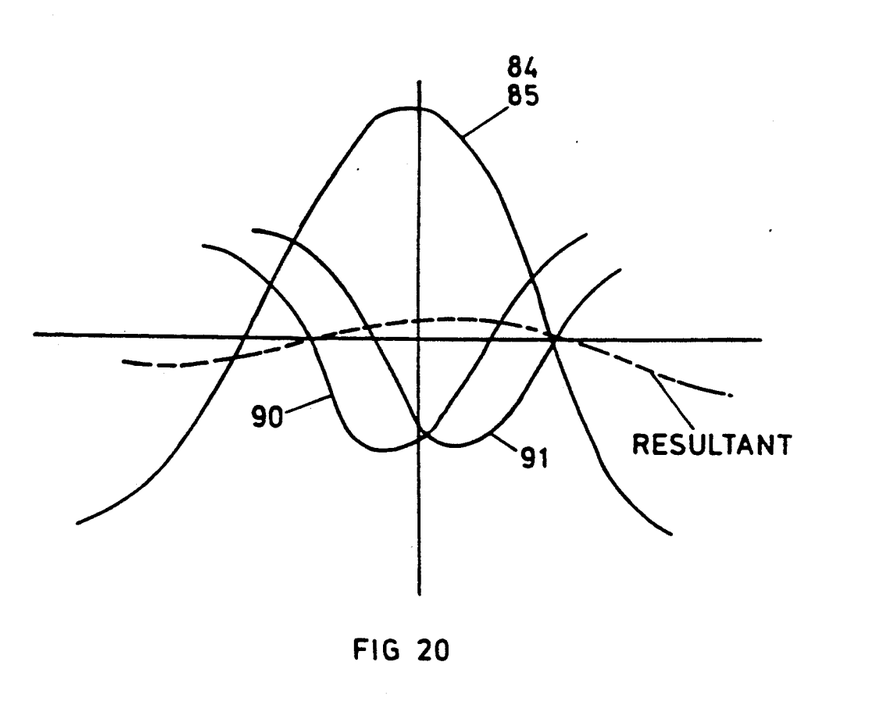

FIG. 18 shows an improved arrangement in which there are provided two side loops 90,91 on either side of the lead wires 84,85 and connected such that the side loop emfs add but subtract from the emf produced by the lead wires 84,85 with even better noise reduction. As can be seen the length of each side loop must be half of that of the lead wires 84,85 since there are two loops and their voltages add. The wave forms are shown in FIG. 20.

The above arrangement can be extended to any number of side loops of the correct lengths and suitably connected to give even better noise reduction. In practice it has been found that two side loops is a good compromise between noise reduction and sensor wiring complexity.

We claim:

1. An apparatus for measuring change of position of a rotor in a drive system comprising a first rotor adapted to be driven by a drive means and a second rotor generally concentrically mounted with respect to said first rotor, said first and second rotors being magnetically coupled together, whereby said second rotor is driven by said first rotor, said apparatus comprising:
    a conduction means stationarily mounted between said rotors for producing emf (electro motive force) as said rotors rotate,
    means for measuring the emf produced in said conduction means as said rotors rotate, and
    means for determining, from said measurement, the relative position of the two rotors and/or the position of one of the rotors.

2. The apparatus as claimed in claim 1, wherein the conduction means is mounted on a stationary housing between the driven and drive rotor.

3. The apparatus as claimed in claim 1 or 2, wherein the drive system is a seal-less pump including a sealing shroud between the drive rotor and the driven rotor, said conduction means being mounted on or forming part of said sealing shroud.

4. The apparatus as claimed in claim 3, wherein the conduction means is provided by conducting tracks on a flexible sheet base, the flexible sheet base being wrapped around the housing and being attached thereto.

5. The apparatus as claimed in claim 1, wherein two conduction means are provided at 180° intervals around the axis of the housing.

6. The apparatus as claimed in claim 5 wherein one conduction means is at the top of the housing and one is at the bottom of the housing.

7. The apparatus as claimed in claim 1, wherein four conduction means are provided spaced at substantially 90° intervals around the axis of the rotors.

8. The apparatus as claimed in claim 1 wherein the conduction means comprises one or more loops including lengths extending substantially parallel to the axis and the other lengths extending circumferentially around the housing.

9. The apparatus as claimed in claim 8 wherein the lengths extending parallel to the axis are spaced at a distance equal to the pitch distance between successive circumferentially disposed magnets attached to the in and/or outer rotor.

10. The apparatus as claimed in claim 1, wherein the means for determining the relative positions of the two rotors comprises a signal processing means which includes a peak detector to detect the peak value of emf produced by each conduction means.

11. The apparatus as claimed in claim 1, wherein the conduction means is provided at axially opposite ends of the rotor whereby to measure the skew of the rotor.

12. The apparatus as claimed in claim 7, wherein said one or more loops are connected to said means for measuring the emf by means of lead wires, at least one of said lead wires including a side loop.

* * * * *